July 21, 1931.  E. PATRICK  1,815,864
COOLING DEVICE
Filed Feb. 5, 1930  3 Sheets-Sheet 1
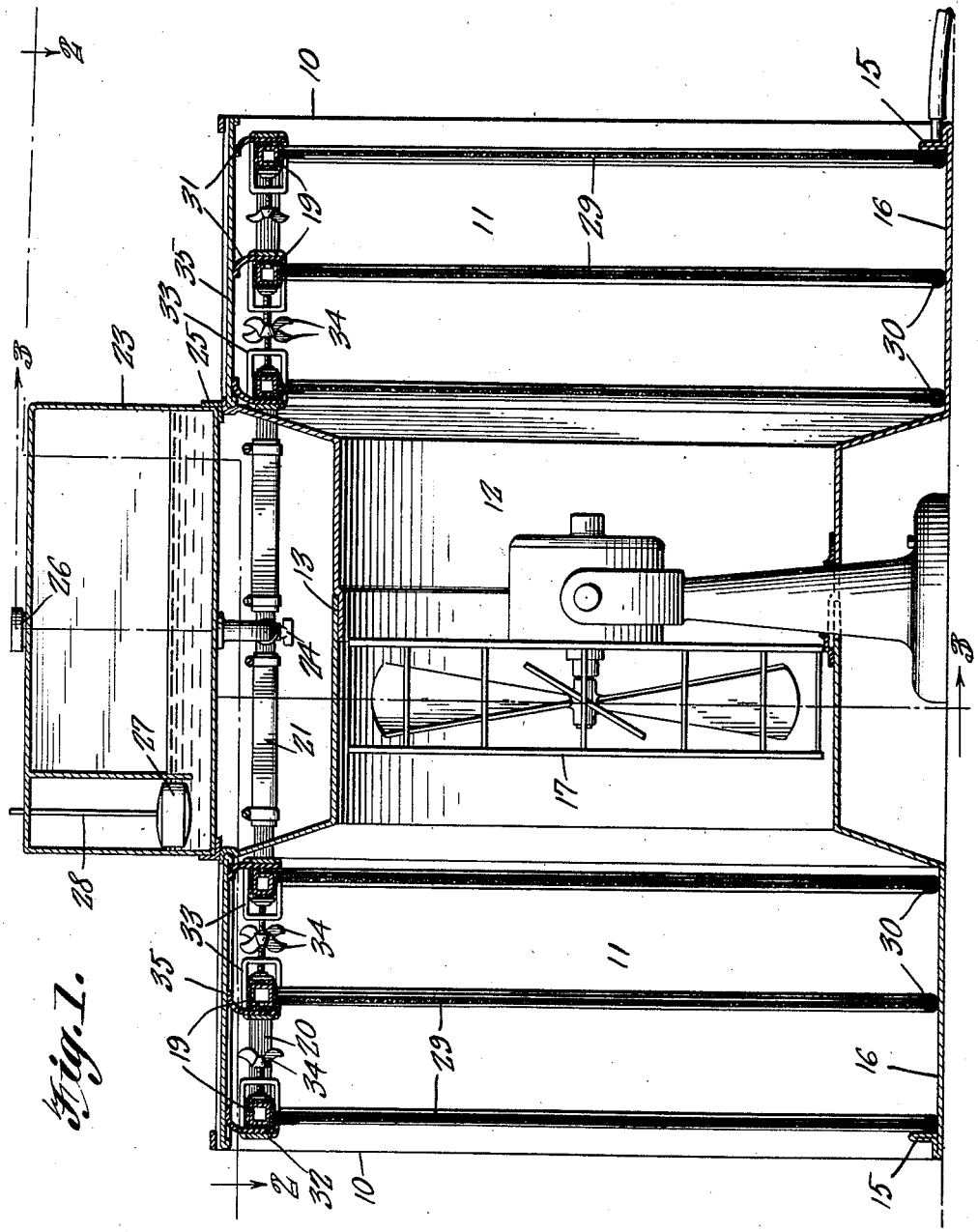
Ella Patrick,
INVENTOR
BY Victor J. Evans
ATTORNEY
WITNESS

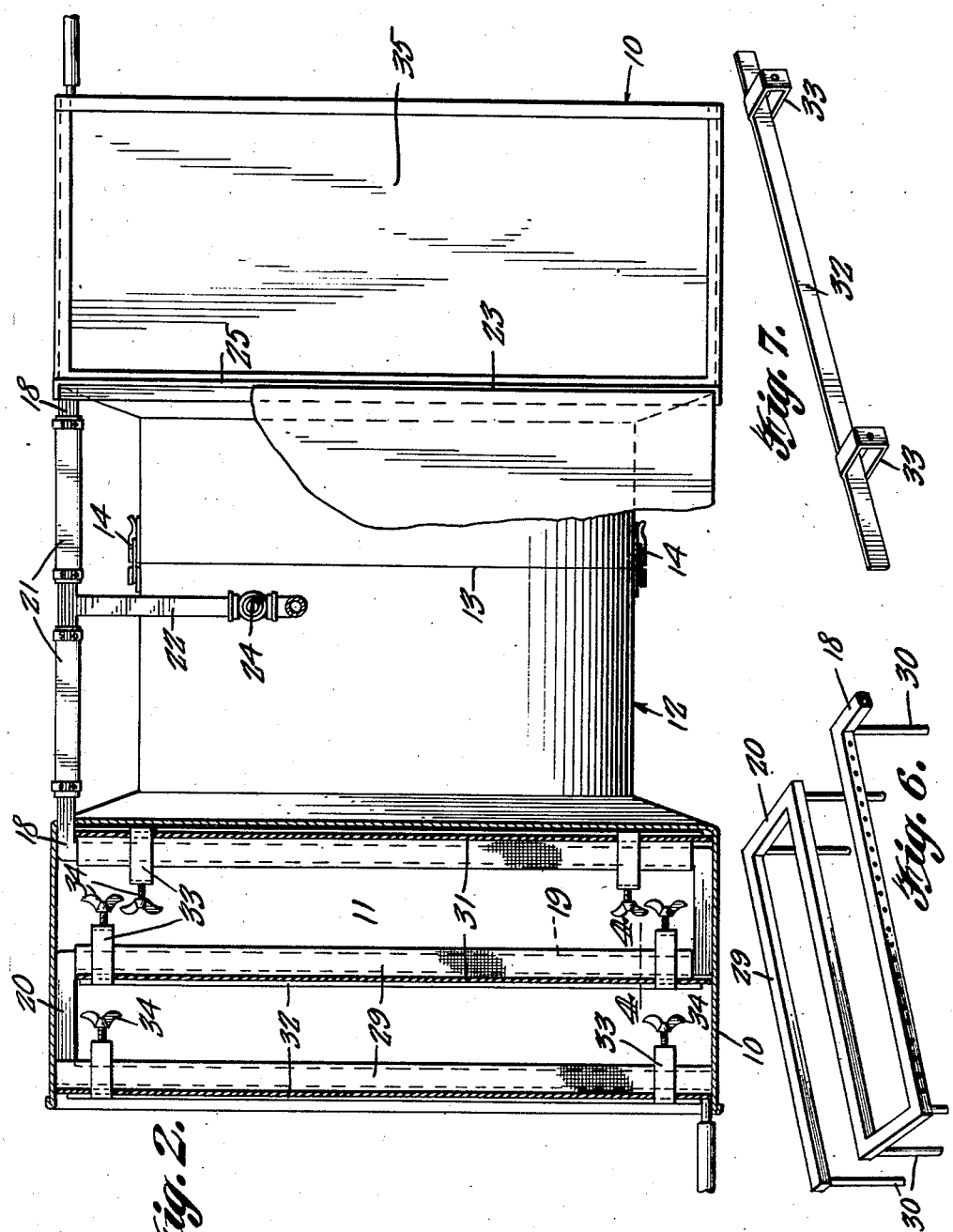

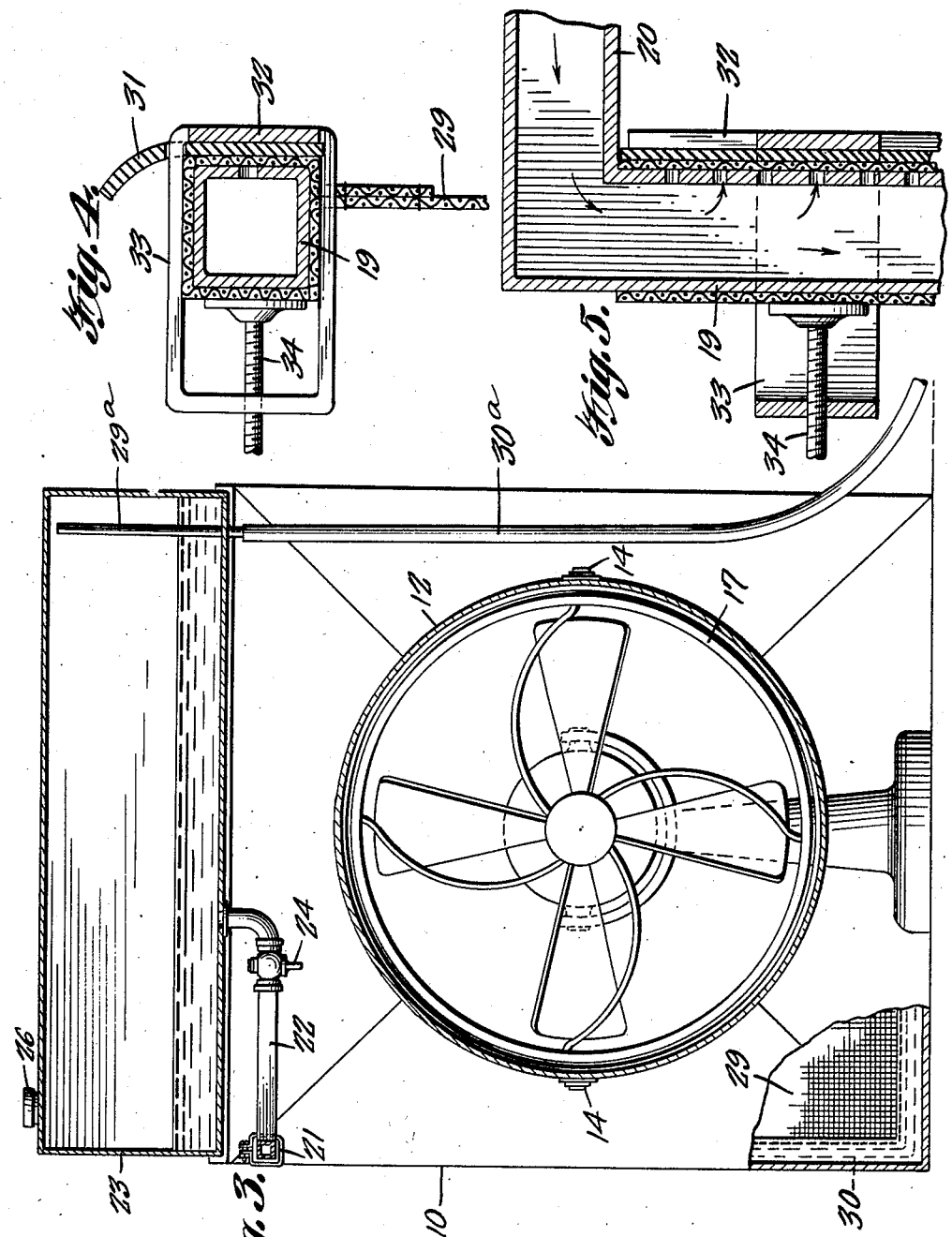

Patented July 21, 1931

1,815,864

UNITED STATES PATENT OFFICE

ELLA PATRICK, OF OLATHE, COLORADO

COOLING DEVICE

Application filed February 5, 1930. Serial No. 426,089.

This invention relates to air moistening and cooling devices and is an improvement upon the device disclosed in application Serial Number 407,527, filed by me November 15, 1929.

An object of the present invention is to provide a device of the above character with novel means for closing the ends of the end closing housing and regulating the flow of water to air moistening screens utilized for this purpose, together with means for supplying water to the screens and for catching surplus water at the bottoms of the screens.

Another object of the invention is the provision of a housing of sectional construction which encloses sectional distributing pipes, whereby the device may be readily taken apart and reassembled when desired.

Another object of the invention is the provision of a device, which in addition to the above and other advantageous features, is simple in construction, efficient in use, and may be manufactured at a nominal cost.

With the above and other objects in view, the invention further includes the following novel features and details of construction, to be hereinafter more fully described, illustrated in the accompanying drawings and pointed out in the appended claims.

In the drawings:—

Figure 1 is a sectional view of the invention.

Figure 2 is a sectional view on the line 2—2 of Figure 1.

Figure 3 is a section on the line 3—3 of Figure 1.

Figure 4 is an enlarged fragmentary sectional view taken substantially on the line 4—4 of Figure 2.

Figure 5 is a horizontal section through one end of one of the sections of the water distributing pipe.

Figure 6 is a fragmentary perspective view of one of the water distributing pipes.

Figure 7 is a like view of one of the valve carrying strips.

Referring to the drawings in detail wherein like characters of reference denote corresponding parts, the invention as illustrated comprises a housing which is preferably of sectional formation and includes complemental sections 10. These sections each include a screen compartment 11 and a portion of a fan compartment 12, the adjacent edges of the sections of the fan compartment being telescopically connected as shown at 13, while fastening devices 14 prevent accidental separation of these sections.

The screen compartments 11 are preferably rectangular, while the fan compartment 12 is preferably cylindrical, the bottoms of the compartments 11 being disposed below the bottom of the compartment 12 together with the side walls of the compartment provide collecting pans 16.

When the sections 10 are assembled a housing is provided which is open at each end and which encloses an electric fan 17 of suitable type. This fan is located within the fan compartment 12 and is readily accessible by separating the sections of the housing.

Arranged within the top of the compartments 11 are water distributing pipes 18. These pipes include spaced parallel perforated sections 19 which are connected by end sections 20. The water distributing pipes 18 have connected thereto pipe sections 21, and the latter are in turn connected to a pipe 22 which leads to a water tank or reservoir 23. A cock 24 controls the supply of water from the reservoir 23 to the pipes 18.

The tank or reservoir 23 is removably mounted upon the sections 10 of the housing, and for this purpose these sections carry angle irons 25 within which the tank is seated. The tank is provided with a filling opening which is closed by a plug 26 and with a float 27, the latter having a stem 28 which extends upward through an opening in the top of the tank. This stem will provide a gauge to indicate the level of water within the tank. The tank is further provided with an overflow pipe 29ª and this pipe may have connected thereto a hose or flexible tube 30ª for carrying the overflow to any suitable point. Through the use of this overflow, a constant supply of water from any suitable source, may be fed to the tank 23, so that a continuous supply of cool water may be provided.

Secured around the perforated sections 19 of the water distributing pipes are the upper edges of fabric screens 29. The other edges of these screens are secured around a frame 30 arranged within the housing and these screens act to close the opposite ends of the housing.

Water from the tank 23 will pass through the pipes 18 to the upper edges of the screens 29 and will flow downward and saturate these screens, one set of screens being arranged in the path of air from the fan 17, while the fan will draw in air from the other set of screens. This last referred to set will furnish relatively cool air to the fan, which will be further cooled in its passage through the screens 29, the rapidly evaporating water from these screens being distributed through the atmosphere for an appreciable distance and lowering the temperature in the vicinity of the apparatus.

In order to regulate the flow of water to the screens 29, the invention provides rubber or other strips 31. These strips are carried by strips 32 which extend along the pipe sections 19, the strips 31 being interposed between the strips 32 and these openings so as to provide a valve. The strips 32 are carried by yokes 33 which extend over the pipe sections 19 and these yokes carry clamps 34 which engage the pipe sections, so that by adjusting these clamps, pressure of the strips 31 over the perforations of the pipe sections may be regulated and the quantity of water discharge from the pipe sections may be thus accurately controlled. In addition, the upper edges of the strips 31 engage the top of the screen compartments 11, the tops of these compartments being formed by slides 35, so that ready access to the clamps for the purpose of adjusting the flow of water may be obtained.

The invention is susceptible of various changes in its form, proportions and minor details of construction and the right is herein reserved to make such changes as properly fall within the scope of the appended claims.

Having described the invention what is claimed is:—

1. In combination, a housing, an electric fan located therein, a perforated water distributing pipe located within the housing and spaced from the fan, a fabric screen suspended from said pipe, a strip of flexible material extending from said pipe and engaging the top of the housing and covering the perforations of the pipe, and means to adjust the strip with respect to the perforations to control the passage of water through said perforations.

2. In combination, a housing open at each end, an electric fan within the housing, a horizontally disposed water distributing pipe located within the housing upon each side of the fan and including spaced parallel perforated sections and end sections connecting said parallel sections, fabric screens depending from the perforated sections and closing the ends of the housing, means to supply water to the water distributing pipes, and means to regulate the discharge water from the perforated sections of said pipes.

3. In combination, a housing open at each end, an electric fan within the housing, a horizontally disposed water distributing pipe located within the housing upon each side of the fan and including spaced parallel perforated sections and end sections connecting said parallel sections, fabric screens depending from the perforated sections and closing the ends of the housing, means to supply water to the water distributing pipes, water discharging regulating strips carried by the perforated sections and means to adjust the strips to regulate the discharge of water.

4. In combination, a housing open at each end, an electric fan therein, a horizontally disposed water distributing pipe located within the housing upon each side of the fan and including spaced parallel perforated sections and end sections connecting said parallel sections, fabric screens depending from the perforated sections and closing the ends of the housing, a water supply tank mounted upon the top of the housing and having communication with the distributing pipes, and means to regulate the discharge of water from the distributing pipes.

5. In combination, a housing formed of a pair of separate complemental sections, means to detachably connect said sections to provide a relatively long housing open at each end, an electric fan located centrally within the housing, fabric screens arranged within the housing upon opposite sides of the fan and closing the ends of the housing, means to supply water in regulated quantities to the upper edges of the screen, and water receptacles included in the housing structure at the lower ends of the screens.

In testimony whereof I affix my signature.

ELLA PATRICK.